(12) United States Patent
Katano

(10) Patent No.: US 11,584,093 B2
(45) Date of Patent: Feb. 21, 2023

(54) HIGH-PRESSURE TANK AND METHOD OF MANUFACTURING THE SAME

(71) Applicant: TOYOTA JIDOSHA KABUSHIKI KAISHA, Toyota (JP)

(72) Inventor: Koji Katano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 502 days.

(21) Appl. No.: 16/775,742

(22) Filed: Jan. 29, 2020

(65) Prior Publication Data

US 2020/0247070 A1 Aug. 6, 2020

(30) Foreign Application Priority Data

Jan. 31, 2019 (JP) .............................. JP2019-015669

(51) Int. Cl.
*B60K 15/03* (2006.01)
*B29C 70/22* (2006.01)
*F17C 1/06* (2006.01)

(52) U.S. Cl.
CPC ...... *B29C 70/228* (2013.01); *B60K 15/03006* (2013.01); *F17C 1/06* (2013.01); *B60K 2015/03032* (2013.01); *B60K 2015/03315* (2013.01)

(58) Field of Classification Search
CPC ............ B29C 70/228; B60K 15/03006; B60K 2015/03032; B60K 2015/03315; B60K 2015/03046; F17C 1/06; F17C 2203/0668
See application file for complete search history.

(56) References Cited

U.S. PATENT DOCUMENTS

| 5,211,306 | A | * | 5/1993 | Delonge-Immik ... B60R 21/268 220/588 |
| 2012/0024746 | A1 | * | 2/2012 | Otsubo .................. F17C 13/06 156/187 |
| 2013/0299505 | A1 | * | 11/2013 | Otsubo .................... F17C 1/16 156/172 |

FOREIGN PATENT DOCUMENTS

JP 2005-106142 A 4/2005

* cited by examiner

*Primary Examiner* — Stephen J Castellano
(74) *Attorney, Agent, or Firm* — Hunton Andrews Kurth LLP

(57) ABSTRACT

A high-pressure tank includes a liner for storing a fluid, and a reinforcing layer covering an outer surface of the liner and including a fiber wound around the liner and a resin. The reinforcing layer includes a helical layer group including laminated helical layers, and a large-angle layer provided adjacent to the helical layer group and on the liner-side. The helical layer group includes an innermost layer that is closest to the liner and that is one of first and second helical layers respectively having the largest and second largest fiber winding angles, an outermost layer that is closest to an outer surface of the high-pressure tank and that is the other one of the first and second helical layers, and an intermediate layer disposed between the innermost and outermost layers and including a helical layer that is smaller in winding angle than the innermost and outermost layers.

5 Claims, 3 Drawing Sheets

FIG. 3
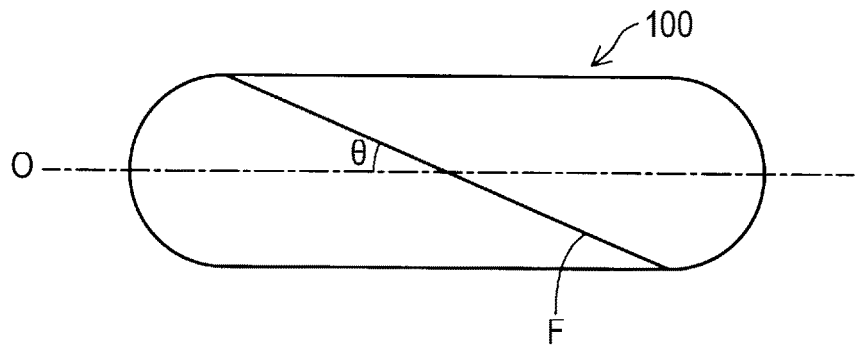
FIG. 4
| LAYER NO. | 1 | 2 | 3 | 4 | 5 | 6 | 7 | 8 | 9 | 10 | 11 |
|---|---|---|---|---|---|---|---|---|---|---|---|
| WINDING ANGLE | 20 | 15 | 19 | 17 | 8 | 10 | 8 | 10 | 15 | 17 | 20 |
| DIFFERENCE IN WINDING ANGLE | | 5 | 4 | 2 | 9 | 2 | 2 | 2 | 5 | 2 | 3 |
FIG. 5
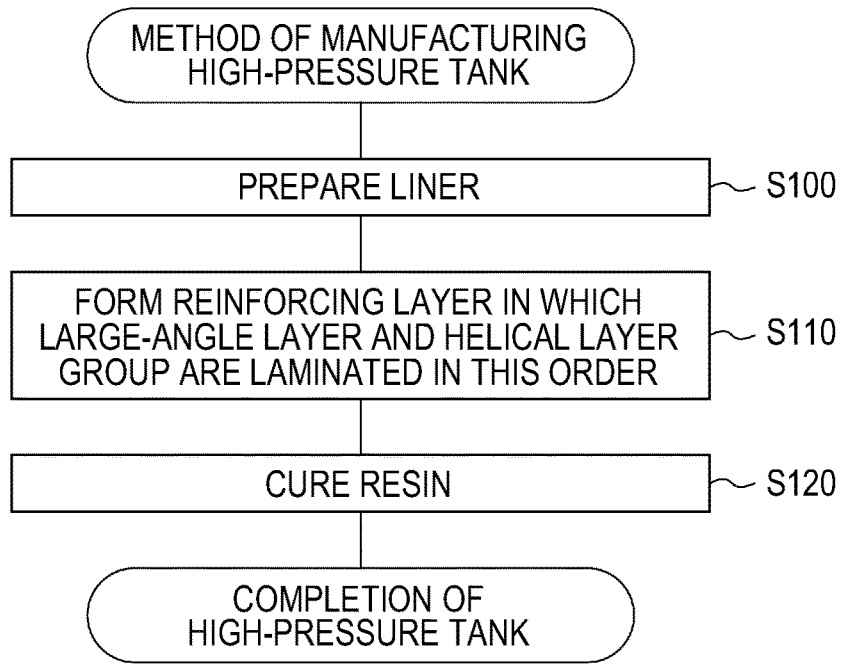

FIG. 6

| LAYER NO. | 1 | 2 | 3 | 4 | 5 | 6 | 7 | 8 | 9 | 10 | 11 |
|---|---|---|---|---|---|---|---|---|---|---|---|
| WINDING ANGLE | 20 | 20 | 19 | 17 | 17 | 15 | 15 | 10 | 10 | 8 | 8 |
| DIFFERENCE IN WINDING ANGLE | | 0 | 1 | 2 | 0 | 2 | 0 | 5 | 0 | 2 | 0 |

FIG. 7

| LAYER NO. | 1 | 2 | 3 | 4 | 5 | 6 | 7 | 8 | 9 | 10 | 11 |
|---|---|---|---|---|---|---|---|---|---|---|---|
| WINDING ANGLE | 20 | 17 | 19 | 15 | 10 | 8 | 10 | 8 | 15 | 17 | 20 |
| DIFFERENCE IN WINDING ANGLE | | 3 | 2 | 4 | 5 | 2 | 2 | 2 | 7 | 2 | 3 |

FIG. 8

| LAYER NO. | 1 | 2 | 3 | 4 | 5 | 6 | 7 | 8 | 9 | 10 | 11 |
|---|---|---|---|---|---|---|---|---|---|---|---|
| WINDING ANGLE | 22 | 17 | 19 | 15 | 10 | 8 | 10 | 8 | 15 | 17 | 20 |
| DIFFERENCE IN WINDING ANGLE | | 5 | 2 | 4 | 5 | 2 | 2 | 2 | 7 | 2 | 3 |

HIGH-PRESSURE TANK AND METHOD OF MANUFACTURING THE SAME

CROSS-REFERENCE TO RELATED APPLICATION

This application claims priority to Japanese Patent Application No. 2019-015669 filed on Jan. 31, 2019, incorporated herein by reference in its entirety.

BACKGROUND

1. Technical Field

The disclosure relates to a high-pressure tank and a method of manufacturing the same.

2. Description of Related Art

Examples of tanks configured to store a high-pressure fluid in a sealed manner include a tank including a liner that defines a space in which to store a fluid, and a reinforcing layer that is provided such that the liner is covered with the reinforcing layer, that is made of fiber reinforced plastic (FRP) including a resin and a fiber, and that is configured to ensure adequate strength against the tank internal pressure. Japanese Unexamined Patent Application Publication No. 2005-106142 (JP 2005-106142 A) describes a pressure vessel that includes a reinforcing layer including a plurality of helical winding portions each including a fiber helically wound around a liner. In the reinforcing layer, the helical winding portions are disposed such that the fiber winding angle gradually increases from an inner helical winding portion provided close to the liner toward an outer helical winding portion.

SUMMARY

In a reinforcing layer of a high-pressure tank, various kinds of layers including a helical layer that includes a fiber wound helically and a hoop layer that includes a fiber wound in a hoop pattern may be arranged in various orders. However, sufficient studies have not been made on the improvement of tank performance, such as durability of the entire tank, in consideration of the positional relationship between these layers in the reinforcing layer.

The present disclosure can be implemented in the following aspect.

(1) An aspect of the disclosure relates to a high-pressure tank. The high-pressure tank includes: a liner having an internal space in which to store a fluid; and a reinforcing layer including a fiber wound around the liner and a resin, and provided on an outer surface of the liner such that the outer surface of the liner is covered with the reinforcing layer. The reinforcing layer includes: a helical layer group including laminated helical layers in each of which the fiber is helically wound; and a large-angle layer provided at a position that is adjacent to the helical layer group and that is on a side close to the liner. The large-angle layer is larger in fiber winding angle than any of the helical layers of the helical layer group. The fiber winding angle is a winding angle of the fiber with respect to a direction of an axis of the high-pressure tank. The helical layer group includes an innermost layer, an outermost layer, and an intermediate layer. The innermost layer is disposed closest to the liner. The innermost layer is one of a first helical layer having a largest fiber winding angle among the helical layers of the helical layer group and a second helical layer having a second largest fiber winding angle among the helical layers of the helical layer group. The outermost layer is disposed closest to an outer surface of the high-pressure tank. The outermost layer is the other one of the first helical layer and the second helical layer. The intermediate layer is disposed between the innermost layer and the outermost layer. The intermediate layer includes a helical layer having a fiber winding angle that is smaller than each of a fiber winding angle of the innermost layer and a fiber winding angle of the outermost layer. With the configuration of the high-pressure tank according to this aspect, the difference in fiber winding angle between the large-angle layer and the helical layer group can be made smaller. Thus, a shear stress generated between the large-angle layer and the helical layer group can be kept low, whereby the durability of the high-pressure tank can be improved. Further, it is easy to appropriately set a difference in fiber winding angle between adjacent layers in the helical layer group. Consequently, the occurrence of fiber winding collapse in the helical layer group can be restrained. Thus, it is possible to easily curb reduction in the strength and durability of the high-pressure tank due to fiber winding collapse. As a result, the performance of the high-pressure tank can be improved. (2) In the high-pressure tank according to the above aspect, fiber winding angles of the helical layers disposed adjacent to each other in the helical layer group may be different from each other. With this configuration of the high-pressure tank, the occurrence of fiber winding collapse in the helical layer group can be restrained. Thus, it is possible to enhance the effect of curbing reduction in the strength and durability of the high-pressure tank due to fiber winding collapse. (3) In the high-pressure tank according to the above aspect, the innermost layer may be the first helical layer, and the outermost layer may be the second helical layer. With this configuration of the high-pressure tank, it is possible to reduce a stress generated in the reinforcing layer. Thus, it is possible to enhance the effect of improving the durability of the high-pressure tank. (4) In the high-pressure tank according to the above aspect, the helical layers of the helical layer group may be laminated in such an order that a standard deviation in a case where a group of differences in fiber winding angle between the helical layers adjacent to each other is used as a population is minimized. With this configuration of the high-pressure tank, the physical properties of the layers of the helical layer group are made more uniform by reducing the variations in the difference in fiber winding angle between adjacent helical layers in the helical layer group, and thus generation of a stress in the helical layer group can be reduced. The disclosure may be implemented in various aspects other than the above aspect. For example, the disclosure may be implemented in an aspect related to a method of manufacturing a high-pressure tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram schematically illustrating a fiber winding angle;

FIG. 4 is a diagram illustrating an example of a helical layer group;

FIG. 5 is a flowchart illustrating an outline of a method of manufacturing a high-pressure tank;

FIG. 6 is a diagram illustrating an example of the helical layer group;

FIG. 7 is a diagram illustrating an example of the helical layer group; and

FIG. 8 is a diagram illustrating an example of the helical layer group.

DETAILED DESCRIPTION OF EMBODIMENTS

A. First Embodiment

A-1. Overall Configuration of High-Pressure Tank

Figure 1:
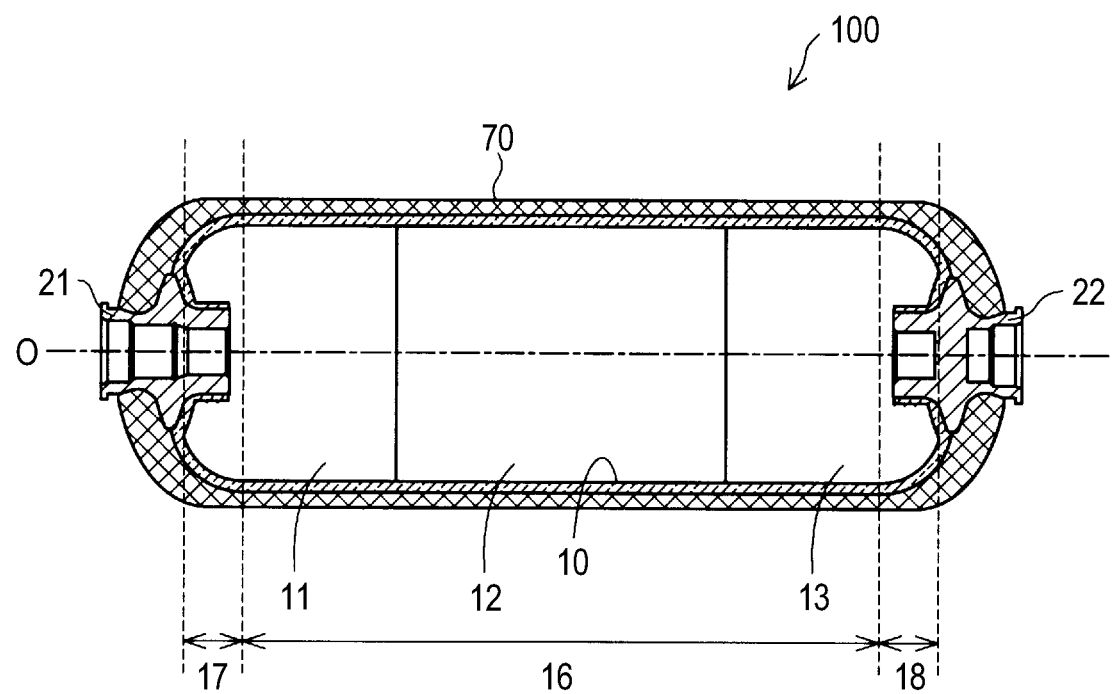
FIG. 1 is a schematic sectional view of a high-pressure tank.

FIG. 1 is a schematic sectional view of a high-pressure tank 100 according to a first embodiment of the present disclosure. The high-pressure tank 100 is configured to store a high-pressure fluid. In the present embodiment, the high-pressure tank 100 stores compressed hydrogen as a fluid, and is mounted in, for example, a fuel cell vehicle that is a hydrogen tank-equipped vehicle. The high-pressure tank 100 includes a liner 10, a reinforcing layer 70, and caps 21, 22. Note that FIG. 1 and other drawings (described later) schematically illustrate various portions of the high-pressure tank 100 according to the present disclosure, and therefore the sizes of the various portions illustrated in the drawings do not represent specific sizes.

A space in which to store a high-pressure gas is defined in the liner 10. The liner 10 includes a cylindrical portion 16 having a cylindrical shape and extending in a direction of an axis O, and two domical portions 17, 18 having a generally hemispherical shape and extending respectively from opposite ends of the cylindrical portion 16. The liner 10 of the present embodiment is made of a polyamide resin. Examples of the polyamide resin of the liner 10 include nylon 6, nylon 66, nylon 610, nylon 612, nylon 11, and nylon 12. In the present embodiment, the liner 10 is made of nylon 6.

In the present embodiment, the liner 10 is formed by joining a plurality of members together. Specifically, the liner 10 includes liner members 11, 12, 13, and the liner members 11, 12, 13 are disposed in this order in the direction of the axis O. The liner member 11 and the liner member 12 may be joined together, and the liner member 12 and the liner member 13 may be joined together, by, for example, infrared welding, laser welding, heat plate welding, vibration welding, or ultrasonic welding. The number of members included in the liner 10 is not limited to three, and may be any number equal to or greater than two. The liner 10 may be formed in a method other than the method of joining a plurality of members together. For example, the liner 10 may be wholly formed by integral molding. Further, at the opposite ends of the liner 10, the caps 21, 22 are respectively disposed at the tops of the domical portions 17, 18. The caps 21, 22 are joined respectively to the liner members 11, 13, for example, by insert molding.

The reinforcing layer 70 is provided such that an outer surface of the liner 10 is covered with the reinforcing layer 70. The reinforcing layer 70 reinforces the liner 10, thereby improving the strength of the high-pressure tank 100 (i.e., the strength against the tank internal pressure). The reinforcing layer 70 is made of fiber reinforced plastic (FRP) including, as its constituent elements, a fiber wound around the outer surface of the liner 10 and a resin with which the fiber is impregnated. Specifically, the reinforcing layer 70 is formed by winding a long fiber impregnated with a resin around the outer surface of the liner 10 by a filament winding method (hereinafter, referred to as "FW method") and then curing the resin. In a typical FW method, hoop winding for covering an outer surface of the cylindrical portion 16 of the liner 10 and helical winding for covering outer surfaces of the domical portions 17, 18 are used. The reinforcing layer 70 includes a plurality of layers that differ in fiber type or fiber winding manner.

Figure 2:
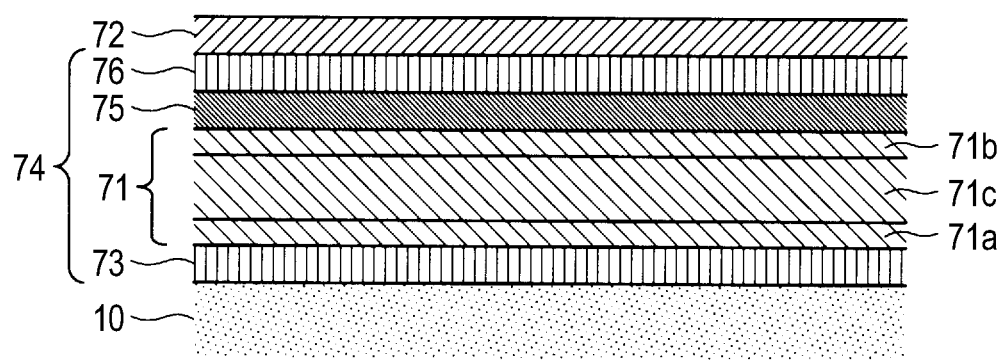
FIG. 2 is an enlarged schematic sectional view illustrating a part of an outer wall of the high-pressure tank.

FIG. 2 is an enlarged schematic sectional view illustrating a part of an outer wall of the high-pressure tank 100. The reinforcing layer 70 includes a carbon fiber reinforced plastic layer 74 (hereinafter, also referred to as "CFRP layer 74") provided on the liner 10 and containing carbon fiber reinforced plastic (CFRP), and a glass fiber reinforced plastic layer 72 (hereinafter, also referred to as "GFRP layer 72") provided on the CFRP layer and containing glass fiber reinforced plastic (GFRP).

The CFRP layer 74 includes layers each including a carbon fiber wound in a hoop pattern (hereinafter, also referred to as "hoop layer"), and layers each including a carbon fiber helically wound (hereinafter, also referred to as "helical layer"). "Hoop winding" is a winding manner in which the winding angle of a fiber (hereinafter, referred also to as "fiber winding angle") is substantially right angle (90 degrees) with respect to the direction of the axis O of the high-pressure tank 100, whereas "helical winding" is a winding manner in which the fiber winding angle of "helical winding" is smaller than the fiber winding angle of "hoop layer" with respect to the direction of the axis O of the high-pressure tank 100. The CFRP layer 74 of the present embodiment includes a plurality of helical layers that differ in fiber winding angle.

FIG. 3 is a diagram schematically illustrating a fiber winding angle. The fiber winding angle is a fiber winding angle with respect to the direction of the axis O of the high-pressure tank 100. FIG. 3 illustrates the high-pressure tank 100 seen in a direction perpendicular to the direction of the axis O, and indicates that the winding angle of a fiber F is an angle θ. Each of a single helical layer and a single hoop layer is a layer formed by continuously winding a fiber at the same fiber winding angle while gradually shifting the position of the fiber. In a single helical layer, intersecting portions of the fiber overlap with each other, in a thickness direction of the liner 10, at points, but the fiber does not have portions that overlap with each other in the thickness direction linearly over a fiber winding direction.

"Helical winding" may be classified into "large-angle helical winding" in which the fiber winding direction is reversed at the domical portion after the fiber makes at least one turn around the axis O and the fiber winding angle is relatively large, and "small-angle helical winding" in which the fiber winding direction is reversed at the domical portion before the fiber makes one turn around the axis O and the fiber winding angle is relatively small. The fiber winding angle in a layer in which the fiber is wound in a hoop pattern (hereinafter, also referred to as "hoop layer") may be, for example, within a range from 80° to 90° and is preferably equal to or larger than 88°. The fiber winding angle in a layer in which the fiber is helically wound at a large fiber winding angle (hereinafter, also referred to as "large-angle helical layer") may be, for example, equal to or greater than 70° and is preferably equal to or larger than 78°. The fiber winding angle in a large-angle helical layer may be equal to or smaller than 85° and is preferably equal to or smaller than 81°. Note that, the fiber winding angle in a hoop layer is larger than that in a large-angle helical layer. The fiber winding angle in a layer in which the fiber is helically wound at a small fiber winding angle (hereinafter, also referred to as "small-angle helical layer") needs to exceed 0° and is preferably equal to or larger than 5°. The fiber winding angle in a small-angle helical layer may be set as appropriate based on, for example, the length of the high-pressure tank 100, and the size of each of the caps 21, 22 such that the outer surface of the liner 10 is entirely covered with the small-angle helical layer. Further, the fiber winding angle in a small-angle helical layer may be smaller than 70°, may be equal to or smaller than 50°, may be equal to or smaller than 40°, and may be equal to or smaller than 35°.

The CFRP layer 74 illustrated in FIG. 2 includes a first hoop layer 73, a helical layer group 71, a large-angle helical layer 75, and a second hoop layer 76 that are laminated in this order from the liner 10-side. The helical layer group 71 is formed by laminating small-angle helical layers each including a fiber helically wound at a small winding angle. The helical layer group 71 includes three or more small-angle helical layers. The helical layer group 71 will be described later in detail.

The order of lamination illustrated in FIG. 2 is merely one example. The number of layers of the CFRP layer 74 and the order of lamination may be changed as needed, as long as a large-angle layer including a fiber wound at a fiber winding angle larger than that in any of the helical layers of the helical layer group 71 is disposed at a position that is adjacent to the helical layer group 71 and that is on the side close to the liner 10. In the present embodiment, as illustrated in FIG. 2, the large-angle layer is a hoop layer (the first hoop layer 73). However, the large-angle layer may be a large-angle helical layer.

Winding-angle change portions where the fiber winding angle is changed are present between the layers of the CFRP layer 74. Specifically, winding-angle change portions where the fiber winding angle is significantly changed are respectively present, for example, between the first hoop layer 73 and the helical layer group 71, and between the helical layer group 71 and the large-angle helical layer 75. In each winding-angle change portion where the fiber winding angle is changed as described above, the fiber is wound while the fiber winding angle is variously changed, and the winding position of the fiber is shifted to a winding start position for a next layer.

The GFRP layer 72 mainly serves to protect the inside of the tank from a physical or chemical stimulus externally applied to the tank surface. Like the CFRP layer 74, the GFRP layer 72 may be formed by laminating any given number of hoop layers each including a glass fiber impregnated with a resin and wound in a hoop pattern and any given number of helical layers each including a glass fiber impregnated with a resin and helically wound, in any given order. The GFRP layer 72 is provided such that the outer surface of the liner 10 is entirely covered with the GFRP layer 72.

Examples of the resin included in each layer of the CFRP layer 74 and each layer of the GFRP layer 72 include thermosetting resins, such as an epoxy resin, and thermoplastic resins, such as a polyester resin and a polyamide resin. The resin included in the CFRP layer 74 and the resin included in the GFRP layer 72 may be of the same type or different types.

A-2. Helical Layer Group

As described above, the helical layer group 71 is formed by laminating the small-angle helical layers each including a fiber helically wound. As illustrated in FIG. 2, the helical layer group 71 includes an innermost layer 71a that is disposed closest to the liner 10 among the layers of the helical layer group 71. The innermost layer 71a is one of a layer having the largest fiber winding angle among the helical layers of the helical layer group 71 (hereinafter, also referred to as "first helical layer") and a layer having the second largest fiber winding angle (hereinafter, also referred to as "second helical layer"). Further, the helical layer group 71 includes an outermost layer 71b that is disposed closest to the outer surface of the high-pressure tank 100 among the layers of the helical layer group 71. The outermost layer 71b is the other one of the first helical layer and the second helical layer. Furthermore, the helical layer group 71 includes an intermediate layer 71c that is disposed between the innermost layer 71a and the outermost layer 71b, and that includes a helical layer having a smaller fiber winding angle than those of the innermost layer 71a and the outermost layer 71b. Hereinafter, a specific example will be described in more detail.

FIG. 4 is a diagram illustrating an example of the helical layer group 71 formed by laminating eleven small-angle helical layers. "Layer No." illustrated in FIG. 4 signifies the numbers assigned to the helical layers of the helical layer group 71 in ascending order from the helical layer closest to the liner 10 to the helical layer closest to the outer surface of the high-pressure tank 100. The No. 1 layer is the innermost layer 71a, and the No. 11 layer is the outermost layer 71b. The No. 2 to No. 10 layers are included in the intermediate layer 71c. FIG. 4 illustrates the fiber winding angle of each of the helical layers of the helical layer group 71. FIG. 4 also illustrates a difference in fiber winding angle between adjacent layers.

The helical layer group 71 illustrated in FIG. 4 includes two helical layers having a fiber winding angle of 8°, two helical layers having a fiber winding angle of 10°, two helical layers having a fiber winding angle of 15°, two helical layers having a fiber winding angle of 17°, and two helical layers having a fiber winding angle of 20°. In addition, the helical layer group 71 includes one helical layer having a fiber winding angle of 19°.

As described above, in the helical layer group 71, one of the first helical layer having the largest fiber winding angle and the second helical layer having the second largest fiber winding angle is the innermost layer 71a, and the other one of the first helical layer and the second helical layer is the outermost layer 71b. When the helical layers are ranked in a descending order of fiber winding angle, the helical layers having the same fiber winding angle are ranked as different helical layers. Specifically, when the helical layer group 71 includes two or more layers having the largest fiber winding angle, the fiber winding angle of the first helical layer having the largest fiber winding angle and the fiber winding angle of the second helical layer having the second largest fiber winding angle are regarded as the same, and, in this case, the fiber winding angle of the innermost layer 71a and the fiber winding angle of the outermost layer 71b are the same. In the example in FIG. 4, both the fiber winding angle of the No. 1 layer that is the innermost layer 71a and the fiber winding angle of the No. 11 layer that is the outermost layer 71b are 20°. When the helical layer group 71 includes three or more layers having the largest fiber winding angle, any layer other than the innermost layer 71a and the outermost layer 71b, among the helical layers having the largest fiber winding angle, is included in the intermediate layer 71c.

The number of the small-angle helical layers of the helical layer group 71 illustrated in FIG. 4 is merely one example, and may be changed as appropriate. Further, the fiber winding angle of each of the small-angle helical layers illustrated in FIG. 4 is merely one example, and may be changed as appropriate. The fiber winding angle of each of the layers of the helical layer group 71 and the number of helical layers each having its own fiber winding angle may be set as appropriate based on the tank strength to be achieved for the high-pressure tank 100. In this case, for example, when the fiber winding angle of the first helical layer having the largest fiber winding angle and the fiber winding angle of the second helical layer having the second largest fiber winding angle are different from each other, one of the first helical layer and the second helical layer may be used as the innermost layer 71a, and the other one of the first helical layer and the second helical layer may be used as the outermost layer 71b.

In the high-pressure tank 100, the fiber winding angle in each of the layers of the helical layer group 71 can be measured after the high-pressure tank 100 is subjected to dry distillation to volatilize a resin component included in the reinforcing layer 70 and to cause the fiber to remain.

A-3. Method of Manufacturing High-Pressure Tank

FIG. 5 is a flowchart illustrating an outline of a method of manufacturing the high-pressure tank 100. In order to manufacture the high-pressure tank 100, first, the liner 10 is prepared (step S100). Step S100 includes an insert molding process of joining the caps 21, 22 respectively to the liner members 11, 13, and a process of joining the liner members 11, 12, 13 together, as described above. Then, a fiber impregnated with a resin is wound around the liner 10 prepared in step S100 to form a resin-impregnated fiber layer (the reinforcing layer 70 before curing) (step S110). In step S110, the reinforcing layer 70 is formed. The reinforcing layer 70 includes the large-angle layer (the first hoop layer 73) and the helical layer group 71 that are laminated in this order from the liner 10-side, as illustrated in FIG. 2. Then, the resin in the resin-impregnated fiber layer is cured (step S120), whereby the high-pressure tank 100 is completed. The resin may be cured through, for example, heating using a heating furnace or an induction heating method using an induction heating coil that induces high-frequency induction heating.

In the helical layer group 71 of the thus configured high-pressure tank 100 of the present embodiment, the innermost layer 71a adjacent to the first hoop layer 73, which is the large-angle layer, is the first helical layer having the largest fiber winding angle or the second helical layer having the second largest fiber winding angle. Thus, the difference in fiber winding angle between the large-angle layer and the helical layer group 71 can be made smaller. When the difference in fiber winding angle between adjacent layers is small, for example, even if charging of a fluid into the high-pressure tank 100 and discharging of the fluid from the high-pressure tank 100 are repeatedly performed and thus expansion and contraction of the high-pressure tank 100 are repeated, a shear stress generated between adjacent layers can be kept low. When the layers differ in fiber winding angle, the physical properties of the layers differ from each other and the layers differ in directions of the expansion and contraction. Thus, as the difference in fiber winding angle between adjacent layers is greater, the shear stress generated at the boundary between the layers is higher. Since the shear stress can be kept low, the durability of the reinforcing layer 70 can be increased, and as a result, the durability of the high-pressure tank 100 as a whole can be improved.

Further, in the helical layer group 71 of the high-pressure tank 100 of the present embodiment, the outermost layer 71b disposed closest to the outer surface of the high-pressure tank 100 is the first helical layer having the largest fiber winding angle or the second helical layer having the second largest fiber winding angle. By setting the fiber winding angles of both the innermost layer 71a and the outermost layer 71b to large fiber winding angles, it is easy to appropriately set a difference in fiber winding angle between adjacent layers in the helical layer group 71.

FIG. 6 is a diagram illustrating, in a manner similar to that in FIG. 4, an example of the configuration of the helical layer group 71 of a high-pressure tank in a comparative example. In the helical layer group 71, the helical layers may be disposed, for example, such that the fiber winding angle gradually decreases or gradually increases from the innermost layer 71a to the outermost layer 71b. FIG. 6 illustrates a state where the helical layers are disposed such that the fiber winding angle gradually decreases from the innermost layer 71a to the outermost layer 71b. In this case, for example, when the helical layer group 71 includes two or more helical layers having the same fiber winding angle as illustrated in FIG. 6, these layers are disposed in succession. Even when the helical layer group 71 does not include helical layers having the same fiber winding angle, the difference in fiber winding angle between adjacent layers tends to be considerably small. When the fiber winding angle of one layer and the fiber winding angle of the layer adjacent to the one layer (hereinafter, referred to as "the adjacent layer") are considerably close to each other, the fiber in the one layer and the fiber in the adjacent layer overlap each other in the thickness direction of the liner 10 such that the fiber in the one layer and the fiber in the adjacent layer are substantially linearly aligned with each other along the fiber winding direction. The inventor of the present application et al. have gained a new finding that, in such a case, fiber winding collapse tends to occur after the resin-impregnated fiber is wound around the liner 10 and before the resin is cured. The resin-impregnated fiber to be wound around the liner 10 usually includes a fiber bundle formed by bundling together tow prepregs including about 20,000 to about 50,000 single fibers. Therefore, when the fiber bundles overlap with each other in the thickness direction of the liner 10 such that the fiber bundles are substantially linearly aligned with each other along the fiber winding direction, the bundle structure of the fiber bundles easily collapses and the fibers easily become misaligned. When such fiber winding collapse occurs, a desired tension of the fiber cannot be obtained, and the strength and durability of the cured reinforcing layer 70 may be low.

According to the present embodiment, it is possible to restrain the difference in fiber winding angle between adjacent layers from being excessively small in the whole helical layer group 71, thereby making it easy to appropriately set a difference in fiber winding angle between adjacent layers. Consequently, the occurrence of fiber winding collapse can be restrained. As a result, it is possible to curb reduction in the strength and durability of the high-pressure tank 100 due to fiber winding collapse.

In the present embodiment, the large-angle helical layer 75 is provided as a layer disposed at a position that is adjacent to the helical layer group 71 and that is on the side close to the outer surface of the high-pressure tank 100, but another configuration may be employed. For example, the second hoop layer 76 may be disposed adjacent to the helical layer group 71 without providing the large-angle helical layer 75 between the second hoop layer 76 and the helical layer group 71. Alternatively, a configuration may be employed in which such a large-angle layer is not provided at a position that is adjacent to the helical layer group 71 and that is on the side close to the outer surface of the high-pressure tank 100.

When the large-angle layer is disposed at a position that is adjacent to the helical layer group 71 and that is on the side close to the outer surface of the high-pressure tank 100, the difference in fiber winding angle between the large-angle layer disposed at a position that is adjacent to the helical layer group 71 and that is on the side close to the outer surface of the high-pressure tank 100 and the outermost layer 71b of the helical layer group 71 can be made small because the outermost layer 71b is the first helical layer or the second helical layer and thus the fiber winding angle of the outermost layer 71b is large. As a result, it is possible to keep the shear stress low, because the difference in fiber winding angle between adjacent layers is no longer large. Further, when the required number of hoop layers necessary to ensure the strength of the high-pressure tank 100 are provided, the helical layer group 71 is interposed between the hoop layers as in the present embodiment. In this way, it is possible to restrain fiber winding collapse from occurring in the hoop layers, because the number of hoop layers laminated in succession is no longer an excessive number. When the helical layer group 71 is interposed between the hoop layers, a sharp change in the fiber winding angle can be prevented by providing the large-angle helical layer between the helical layer group 71 and the hoop layer, as in the present embodiment.

B. Second Embodiment

FIG. 7 is a diagram illustrating, in a manner similar to that in FIG. 4, an example of the configuration of the helical layer group 71 of the high-pressure tank 100 according to a second embodiment. The high-pressure tank 100 of the second embodiment has the same structure as that of the high-pressure tank 100 of the first embodiment, except for the configuration of the helical layer group 71. FIG. 7 illustrates an example in which eleven small-angle helical layers are provided as in the helical layer group 71 illustrated in FIG. 4. In the second embodiment, the helical layers of the helical layer group 71 are laminated in such an order that the standard deviation in a case where a group of differences in fiber winding angle between adjacent helical layers is used as a population is smaller, more specifically, in such an order that the standard deviation is minimized. For example, in the example illustrated in FIG. 7, the standard deviation is 1.6. In contrast to this, in the example illustrated in FIG. 4, the standard deviation is about 2.154.

With this configuration, the physical properties of the layers of the helical layer group 71 are made more uniform by reducing the variations in the difference in fiber winding angle between adjacent helical layers in the helical layer group 71, and thus generation of a stress in the helical layer group 71 can be reduced. As a result, the durability of the high-pressure tank 100 can be further improved.

C. Third Embodiment

FIG. 8 is a diagram illustrating, in a manner similar to that in FIG. 4, an example of the configuration of the helical layer group 71 of the high-pressure tank 100 according to a third embodiment. The high-pressure tank 100 of the third embodiment has the same structure as that of the high-pressure tank 100 of the first embodiment, except for the configuration of the helical layer group 71. FIG. 8 illustrates an example of the helical layer group 71 that differs from that of the second embodiment of FIG. 7 only in the fiber winding angle of the innermost layer 71a. In the helical layer group 71 of the third embodiment, the innermost layer 71a is the first helical layer having the largest fiber winding angle.

With this configuration, it is possible to enhance the effect of reducing a stress generated in the reinforcing layer 70, as compared with a case where the outermost layer 71b is the first helical layer and the innermost layer 71a is the second helical layer. In the reinforcing layer 70 in which the large-angle layers are provided with the helical layer group interposed therebetween, the large-angle layer disposed on the liner 10-side (the first hoop layer 73) has a higher load share for securing the strength of the high-pressure tank 100 than the large-angle layer disposed on the side close to the outer surface of the high-pressure tank 100 (the large-angle helical layer 75 and the second hoop layer 76). This is presumably because the helical layer group 71 interposed between the large-angle layers is softer than the large-angle layers and thus the load share of the large-angle layer provided on the helical layer group 71 is reduced. A stress is more likely to be generated in an interface between the large-angle layer having a higher load share and the small-angle helical layer, than in an interface between the large-angle layer having a lower load share and the small-angle helical layer. Thus, the fiber winding angle of the innermost layer 71a that is in contact with the large-angle layer on the liner 10-side, which has a higher load share, is set to a larger fiber winding angle to reduce the difference in fiber winding angle between the innermost layer 71a and the large-angle layer. In this way, it is possible to reduce a stress generated in the reinforcing layer 70, thereby enhancing the effect of increasing the durability of the high-pressure tank 100.

D. Other Embodiments (D1) In the foregoing embodiments illustrated in FIG. 4, FIG. 7, and FIG. 8, the fiber winding angles of adjacent helical layers in the helical layer group 71 are different from each other. Alternatively, there may be a portion where the helical layers having the same fiber winding angle are disposed in succession. Even in this case, the foregoing effects can be obtained by setting the innermost layer 71a and the outermost layer 71b, which are adjacent to the large-angle layers, to the layer having the largest fiber winding angle and the layer having the second largest fiber winding angle. That is, it is easier to restrain the difference in fiber winding angle between the innermost layer 71a and the large-angle layer on the liner 10-side and to appropriately secure the difference in fiber winding angle between adjacent layers, in the whole helical layer group.

(D2) In the foregoing embodiments, the helical layer group 71 is a part of the CFRP layer 74 made of carbon fiber reinforced plastic. However, another configuration may be employed. For example, even in a case where a fiber other than a carbon fiber is used to form the reinforcing layer 70, when the same configuration regarding the fiber winding angle as that of any one of the foregoing embodiments is employed in the helical layer group in which the helical layers are laminated, the same effects as those of the foregoing embodiments can be obtained.

The present disclosure is not limited to the foregoing embodiments and may be implemented in various other embodiments within the scope of the appended claims. For example, the technical features of the foregoing embodiments corresponding to the technical features in the aspects described in the summary of the disclosure may be replaced or combined with each other to partially or entirely resolve the technical issues or to partially or entirely exhibit the advantageous effects. Further, any technical feature that is not described as essential technical feature in the specification may be deleted as appropriate.

What is claimed is:

1. A high-pressure tank comprising:
a liner having an internal space in which to store a fluid; and
a reinforcing layer provided on an outer surface of the liner such that the outer surface of the liner is covered with the reinforcing layer, the reinforcing layer including a fiber wound around the liner and a resin, wherein
the reinforcing layer includes
a helical layer group including helical layers in each of which the fiber is helically wound, the helical layers being laminated, and
a large-angle layer provided at a position that is adjacent to the helical layer group and that is on a side close to the liner, the large-angle layer being larger in fiber winding angle than any of the helical layers of the helical layer group, the fiber winding angle being a winding angle of the fiber with respect to a direction of an axis of the high-pressure tank, and
the helical layer group includes
an innermost layer of the helical layer group disposed closest to the liner, the innermost layer of the helical layer group being one of a first helical layer having a largest fiber winding angle among the helical layers of the helical layer group and a second helical layer having a second largest fiber winding angle among the helical layers of the helical layer group,
an outermost layer of the helical layer group disposed closest to an outer surface of the high-pressure tank, the outermost layer of the helical layer group being the other one of the first helical layer and the second helical layer, and
an intermediate layer of the helical layer group disposed between the innermost layer of the helical layer group and the outermost layer of the helical layer group, the intermediate layer of the helical layer group including a helical layer having a fiber winding angle that is smaller than each of a fiber winding angle of the innermost layer of the helical layer group and a fiber winding angle of the outermost layer of the helical layer group.

2. The high-pressure tank according to claim 1, wherein fiber winding angles of the helical layers disposed adjacent to each other in the helical layer group are different from each other.

3. The high-pressure tank according to claim 1, wherein the innermost layer of the helical layer group is the first helical layer, and the outermost layer of the helical layer group is the second helical layer.

4. The high-pressure tank according to claim 1, wherein the helical layers of the helical layer group are laminated in such an order that a standard deviation in a case where a group of differences in fiber winding angle between the helical layers adjacent to each other is used as a population is minimized.

5. A method of manufacturing a high-pressure tank, the method comprising:
preparing a liner having an internal space in which to store a fluid; and
forming a reinforcing layer such that an outer surface of the liner is covered with the reinforcing layer, the reinforcing layer including a fiber wound around the liner and a resin, wherein
when the reinforcing layer is formed, a helical layer group and a large-angle layer are formed,
the helical layer group including helical layers in each of which the fiber is helically wound, the helical layers being laminated, and
the large-angle layer being provided at a position that is adjacent to the helical layer group and that is on a side close to the liner, the large-angle layer being larger in fiber winding angle than any of the helical layers of the helical layer group, the fiber winding angle being a winding angle of the fiber with respect to a direction of an axis of the high-pressure tank, and
when the helical layer group is formed,
an innermost layer of the helical layer group is disposed closest to the liner, the innermost layer of the helical layer group being one of a first helical layer having a largest fiber winding angle among the helical layers of the helical layer group and a second helical layer having a second largest fiber winding angle among the helical layers of the helical layer group,
an outermost layer of the helical layer group is disposed closest to an outer surface of the high-pressure tank, the outermost layer of the helical layer group being the other one of the first helical layer and the second helical layer, and
an intermediate layer of the helical layer group is disposed between the innermost layer of the helical layer group and the outermost layer of the helical layer group, the intermediate layer of the helical layer group including a helical layer having a fiber winding angle that is smaller than each of a fiber winding angle of the innermost layer of the helical layer group and a fiber winding angle of the outermost layer of the helical layer group.

* * * * *